(12) United States Patent
Valadez

(10) Patent No.: US 9,359,819 B1
(45) Date of Patent: Jun. 7, 2016

(54) TOOL HOLDER FOR USE WITH A LADDER

(71) Applicant: Gabriel Valadez, Austin, TX (US)

(72) Inventor: Gabriel Valadez, Austin, TX (US)

( * ) Notice: Subject to any disclaimer, the term of this patent is extended or adjusted under 35 U.S.C. 154(b) by 0 days.

(21) Appl. No.: 14/861,064

(22) Filed: Sep. 22, 2015

(51) Int. Cl.
*E06C 7/14* (2006.01)
*F16B 1/00* (2006.01)
*F16B 2/22* (2006.01)
*F16M 13/02* (2006.01)

(52) U.S. Cl.
CPC ... *E06C 7/14* (2013.01); *F16B 1/00* (2013.01); *F16B 2/22* (2013.01); *F16M 13/022* (2013.01); *F16B 2001/0035* (2013.01)

(58) Field of Classification Search
CPC ............... E06C 7/14; F16B 1/00; F16B 2/22; F16B 2001/0035; F16M 13/022
USPC ........................................................ 211/70.6
See application file for complete search history.

(56) References Cited

U.S. PATENT DOCUMENTS

| | | | |
|---|---|---|---|
| 4,653,713 A * | 3/1987 | Hamilton | B25H 3/02 182/129 |
| 5,333,823 A * | 8/1994 | Joseph | E06C 7/14 182/129 |
| 5,370,263 A | 12/1994 | Brown | |
| D361,664 S | 8/1995 | Brown | |
| 5,542,553 A | 8/1996 | Penniman | |
| 5,624,093 A * | 4/1997 | Gemmell | B44D 3/125 220/570 |
| 5,727,649 A | 3/1998 | Buckley | |
| 5,749,437 A * | 5/1998 | Weller | E06C 7/14 182/129 |
| 5,782,314 A * | 7/1998 | Zeitler | E06C 7/14 182/129 |
| 6,148,958 A | 11/2000 | Ahl | |
| 6,273,289 B1 | 8/2001 | Bowman | |
| 6,364,057 B1 * | 4/2002 | Cornejo | E06C 7/14 182/106 |
| 7,032,711 B1 * | 4/2006 | Katz | E06C 7/14 182/129 |
| 7,063,187 B1 * | 6/2006 | Lavigne | E06C 7/14 182/129 |
| 7,077,238 B2 | 7/2006 | Butler | |
| 7,374,018 B1 * | 5/2008 | Thrun | E06C 7/14 182/129 |
| 8,033,362 B1 | 10/2011 | Cull | |
| 8,636,144 B1 * | 1/2014 | Lawery | E06C 7/14 182/129 |
| 2002/0070136 A1 * | 6/2002 | Hedges | B25H 3/00 206/373 |
| 2006/0000830 A1 * | 1/2006 | Kinskey | A45C 5/00 220/9.1 |
| 2013/0043358 A1 * | 2/2013 | Padilla | E06C 7/14 248/210 |

* cited by examiner

*Primary Examiner* — Korie H Chan
(74) *Attorney, Agent, or Firm* — Kyle A. Fletcher, Esq.

(57) ABSTRACT

The tool holder for use with a ladder is a toolbox adapted for use with a step ladder. The tool holder for use with a ladder is a storage unit that can be securely attached to a ladder to reduce the need to climb up and down the ladder to get required tools. The tool holder for use with a ladder comprises a base structure 101 that further comprises a first container, a second container, one or more pockets, a plurality of clips, a plurality of rings, a first ladder clip and a second ladder clip.

14 Claims, 4 Drawing Sheets

US 9,359,819 B1

TOOL HOLDER FOR USE WITH A LADDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of toolboxes and toolboxes with magnetic holders, more specifically, a toolbox configured for use with a ladder.

SUMMARY OF INVENTION

The tool holder for use with a ladder is a toolbox adapted for use with a step ladder. The tool holder for use with a ladder is a storage unit (also referred to as a toolbox) that can be securely attached to a ladder, which reduces the need to climb up and down the ladder to get required tools. Fasteners such as nails, screws nuts and bolts would be contained in a first compartment that is magnetized to hold the fasteners in place. Holes of various sizes are formed is a second exterior of the tool holder for use with a ladder from which items such as bags and tool holsters can be hung.

These together with additional objects, features and advantages of the tool holder for use with a ladder will be readily apparent to those of ordinary skill in the art upon reading the following detailed description of the presently preferred, but nonetheless illustrative, embodiments when taken in conjunction with the accompanying drawings.

In this respect, before explaining the current embodiments of the tool holder for use with a ladder in detail, it is to be understood that the tool holder for use with a ladder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tool holder for use with a ladder.

It is therefore important that the claims be regarded as including such equivalent construction insofar as they do not depart from the spirit and scope of the tool holder for use with a ladder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
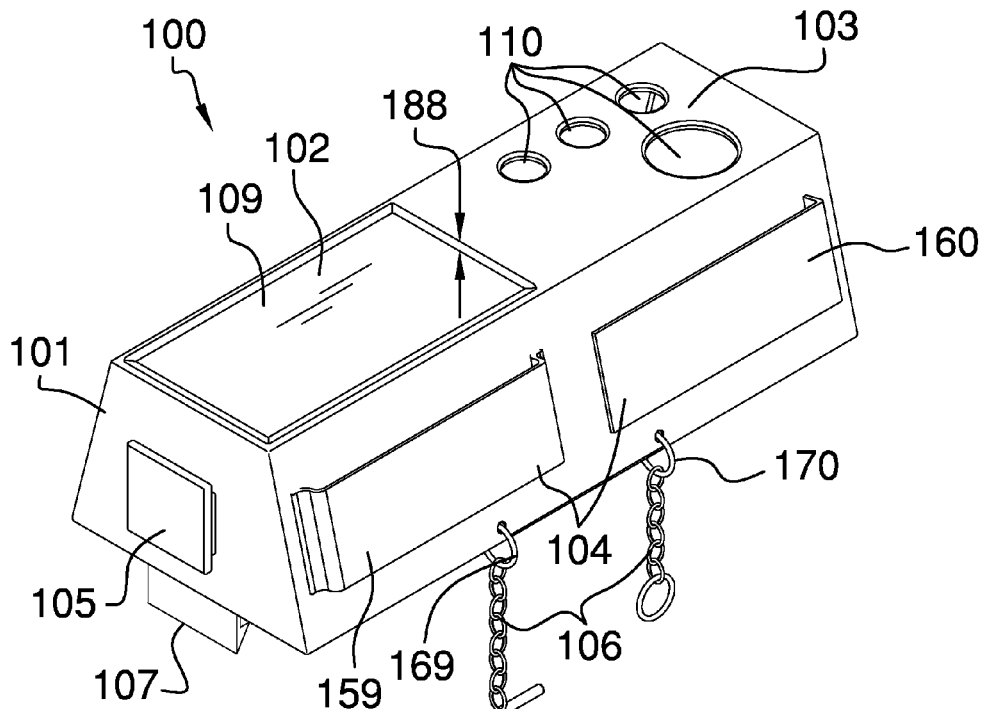
FIG. 1 is a perspective view of an embodiment of the disclosure.
Figure 2:
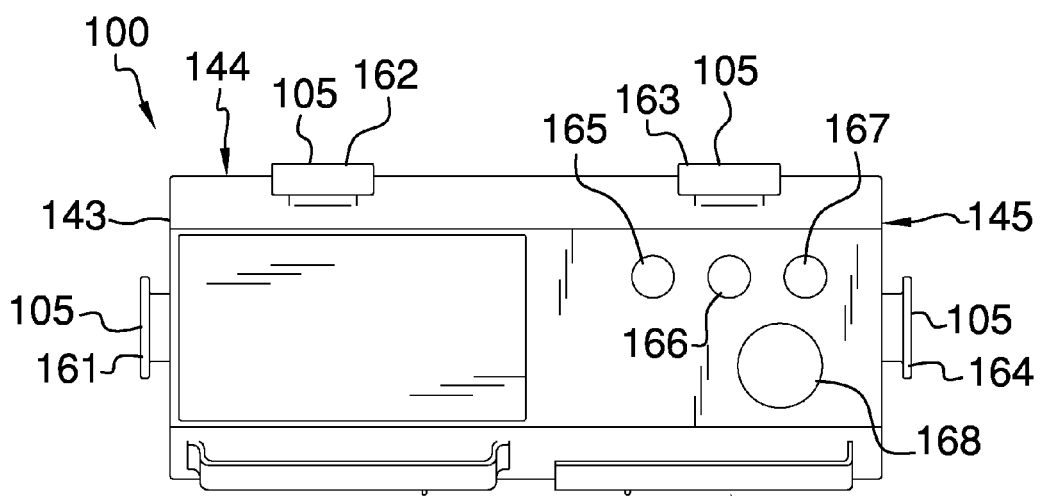
FIG. 2 is a top view of an embodiment of the disclosure.
Figure 3:
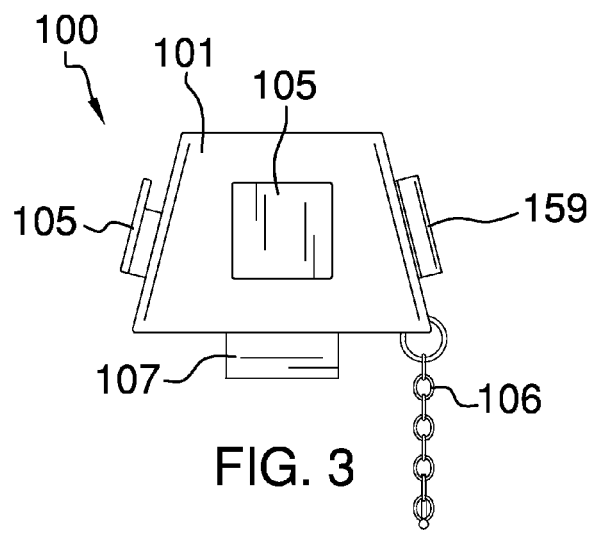
FIG. 3 is a side view of an embodiment of the disclosure.
Figure 4:
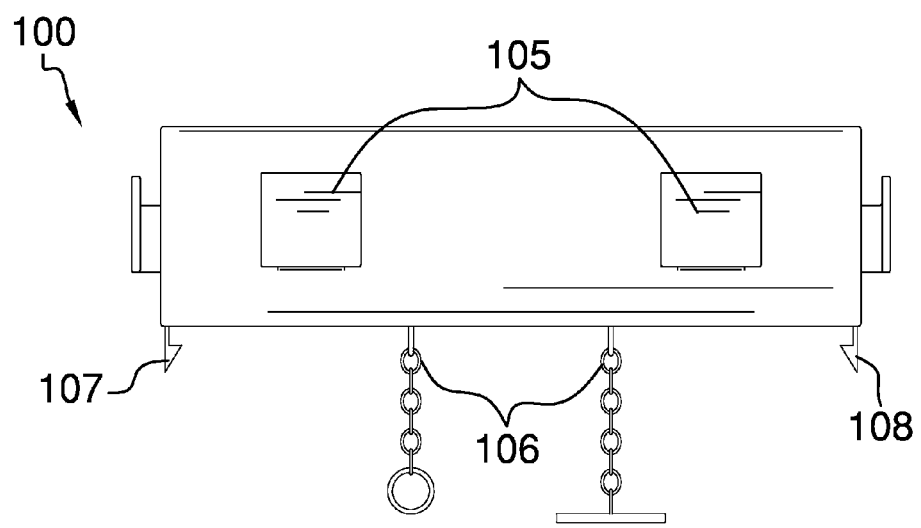
FIG. 4 is a front view of an embodiment of the disclosure.
Figure 5:
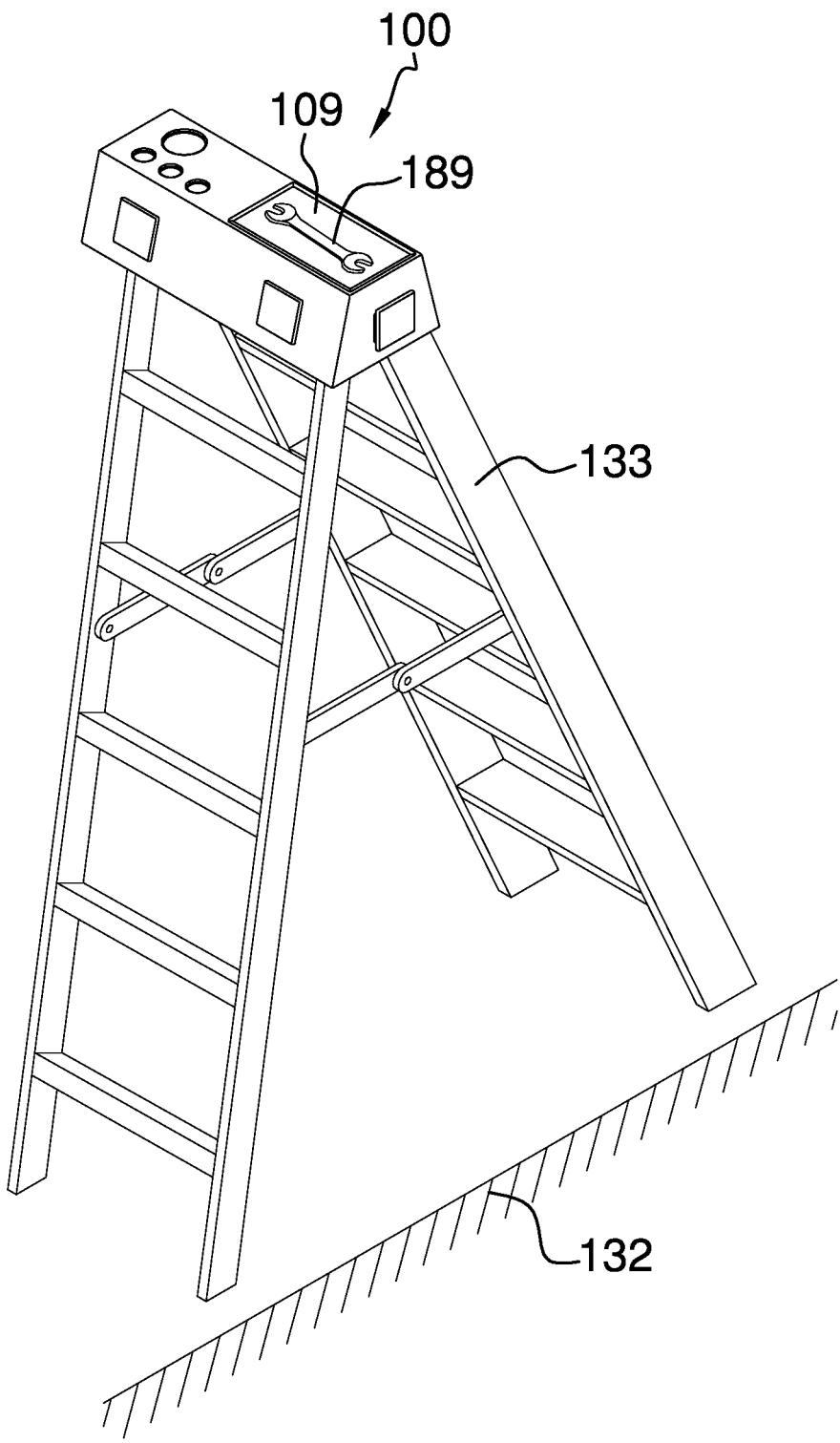
FIG. 5 is an in use view of an embodiment of the disclosure.
Figure 6:
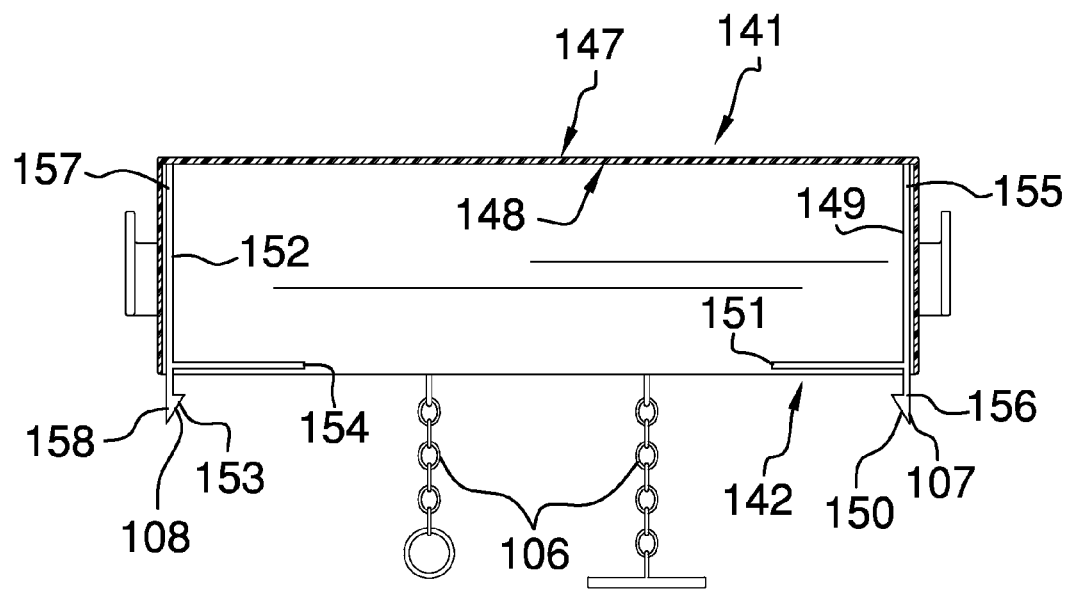
FIG. 6 is a cross-sectional view of an embodiment of the disclosure across 6-6.
Figure 7:
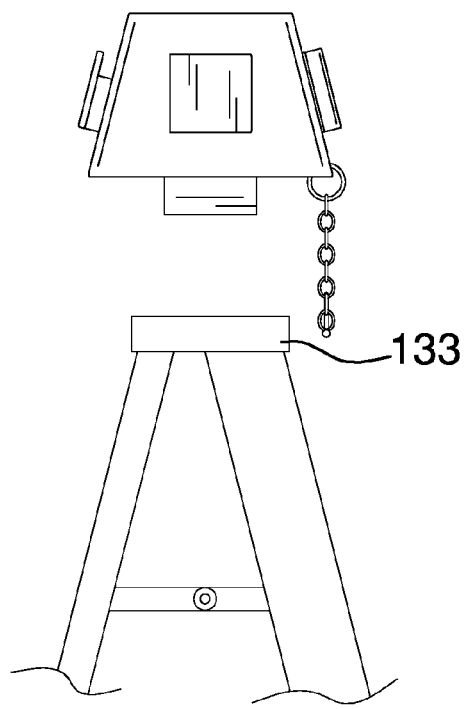
FIG. 7 is a detail view of an embodiment of the disclosure.

Detailed reference will now be made to a first potential embodiment of the disclosure, which is illustrated in FIGS. 1 through 7. The tool holder for use with a ladder 100 (hereinafter invention) comprises a base structure 101 that further comprises a first compartment 102, a second compartment 103, one or more pockets 104, a plurality of clips 105, a plurality of rings 106, a first ladder clip 107 and a second ladder clip 108.

The base structure 101 is a container formed in the shape of a trapezoidal box. The base structure 101 is a hollow shell that provides the foundation upon which the rest of the invention 100 is built. The base structure 101 is further defined with a top side 141, a bottom side 142, a first side 143, a second side 144, a third side 145 and a fourth side 146. When the invention 100 is in use 101, the top side 141 of the base structure 101 is distal from the ground 132. The bottom side 142 of the base structure 101 is the side of the base structure 101 distal from the top side 141. The first side 143, the second side 144, the third side 145 and the fourth side 146 of the base structure 101 project away from the top side 141 of the base structure 101 towards the bottom side 142 of the base structure 101. In the first potential embodiment of the disclosure, the bottom side 142 of the base structure 101 is open. The top side 141 of the base structure 101 is further defined with an upper side 147 and a lower side 148. When the invention 100 is in use, the upper side 147 of the top side 141 is farther from the ground 132 than the lower side 148.

Projecting perpendicularly away from the lower side 148 of the top side 141 are the first ladder clip 107 and the second ladder clip 108. The first ladder clip 107 and the second ladder clip 108 are used to attach the invention 100 the step ladder 131.

The first ladder clip 107 further comprises a first shaft 149, a first hook 150, and an first brace 151. The first shaft 149 is further defined with a first end 155 and a second end 156. The first end 155 of the first ladder clip 107 is attached to the lower side 148 of the top side 141 of the base structure 101. The second end 156 of the first ladder clip 107 is the end distal from the first end 155. The first hook 150 is formed in second end 156 of the first ladder clip 107. The first hook 150 is a triangular projection that projects away from the second end 156 of the first ladder clip 107 in such a way that the second end 156 looks like an arrow head. The purpose of the first hook 150 is to act as a ratchet so that once the base structure 101 is positioned on the step ladder 131 and the first hook 150 is in place, the barb of the first hook 150 prevents the base structure 101 from being pulled up without further user intervention. To secure the base structure 101 using the first hook 150, the first hook 150 can be inserted through a hole formed in the top step 133 of the step ladder 131 or the first hook 150 can be used to secure the bottom side 142 of the top step 133. The purpose of the first brace 151 is to raise the base structure 101 above the top step 133 of the step ladder 131. The first brace 151 is a shaft that projects perpendicularly away from the first shaft 149 between the first end 155 and the second end 156 of the first shaft 149.

The second ladder clip 108 further comprises a second shaft 152, a second hook 153, and a second brace 154. The second shaft 152 is further defined with a third end 157 and a fourth end 158. The third end 157 of the second ladder clip 108 is attached to the lower side 148 of the top side 141 of the base structure 101. The fourth end 158 of the second ladder clip 108 is the end distal from the third end 157. The second hook 153 is formed in the fourth end 158 of the second ladder clip 108. The second hook 153 is a triangular projection that projects away from the fourth end 158 of the second ladder clip 108 in such a way that the fourth end 158 looks like an arrow head.

The purpose of the second hook 153 is to act as a ratchet so that once the base structure 101 is positioned on the step ladder 131 and the second hook 153 is in place, the barb of the second hook 153 prevents the base structure 101 from being pulled up without further user intervention. To secure the base structure 101 using the second hook 153, the second hook 153 can be inserted through a hole formed in the top step 133 of the step ladder 131 or the second hook 153 can be used to secure the bottom side 142 of the top step 133. The purpose of the second brace 154 is to raise the base structure 101 above the top step 133 of the step ladder 131. The second brace 154 is a shaft that projects perpendicularly away from the second shaft 152 between the third end 157 and the fourth end 158 of the second shaft 152.

The first compartment 102 is a magnetic plate 109 that is mounted on the upper side 147 of the top side 141 of the base structure 101. The magnetic plate 109 is used to magnetically hold fasteners and other hardware including, but not limited to, nails, screws, nuts, and bolts. The first compartment 102 is slightly recessed with respect to the second compartment 103. Moreover, the magnetic plate 109 is recessed below the second compartment 103 via a depth 188. The magnetic plate 109 is adapted to secure an object 189 thereon. Moreover, the object 189 shall be magnetic or ferrous so as to attract to the magnetic plate 109.

The second compartment 103 is a plurality of holes 110 that are adapted to receive and store a variety of tools by their handles or other mechanisms. The sizes of each hole of the plurality of holes 110 may, but does not need to, vary to accommodate a broader variety of tools.

The one or more pockets 104, plurality of clips 105, and plurality of rings 106 are mounted on the exterior one or more sides of the base structure 101. The purpose of the one or more pockets 104, plurality of clips 105, and plurality of rings 106 is to provide additional storage for the invention 100.

Each of the one or more pockets 104 is a small bag or other container that is attached to one or more of the sides of the hold small items, including, but not limited to, cell phones or tape measures, in a conveniently accessible location. The edge of the one or more pockets 104 can also be adapted to serve as a surface upon which small items that have clips can be attached.

Each of the plurality of clips 105 are spring like devices that are used to attach items, including, but not limited to, bags, tool belts, or tool holsters, to the base structure 101. The plurality of clips 105 are attached to one or more sides of the base structure 101.

Each of the plurality of rings 106 are circular bands that are used to attach and hang items, including, but not limited to, power tools, from the base structure 101. A hook would commonly be provided to attach these items to any of the plurality of rings 106.

To use the invention 100, the base structure 101 is raised above the top step 133 of the step ladder 131 so that the lower side 148 of the top side 141 is facing towards the ground 132. The base structure 101 is lowered over the top step 133 of the step ladder 131 until the first hook 150 and the second hook 153 are in a securing position. The invention 100 can then be loaded as desired by placing hardware on the magnetic plate 109, and other items in the plurality of holes 110, placing items in the one or more pockets 104 and attaching items to both the plurality of clips 105 and the plurality of rings 106.

In the first embodiment of the disclosure, as shown in FIGS. 1 through 6, the one or more pockets 104 comprises a first pocket 159, and a second pocket 160. The plurality of clips 105 comprises a first clip 161, a second clip 162, a third clip 163, and a fourth clip 164. The plurality of holes 110 comprises a first hole 165, a second hole 166, a third hole 167 and a fourth hole 168. The plurality of rings 106 comprises a second ring 169 and a third ring 170.

The following definitions were used in this disclosure:

One of the Sides: As used in this disclosure, one of the sides refers directly to a side selected from the first side 143, the second side 144, the third side 145, or the fourth side 146.

One or More of the Sides: As used in this disclosure, one or more of the side incorporates the definition of one of the sides and expands it to also include combinations of the first side 143, the second side 144, the third side 145, and the fourth side 146.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tool holder comprising
a base structure;
wherein the tool holder is adapted for use with a ladder;
wherein the base structure further comprises a first ladder clip and a second ladder clip;
wherein the tool holder is attached to the ladder using the first ladder clip and the second ladder clip;

wherein the base structure further comprises a first compartment, a second compartment, one or more pockets, a plurality of clips, and a plurality of rings;

wherein the base structure is a container formed in the shape of a trapezoidal box;

wherein the base structure is further defined with a top side, a bottom side, a first side, a second side, a third side and a fourth side;

wherein the top side of the base structure is further defined with an upper side and a lower side;

wherein attached to the lower side of the top side are the first ladder clip and the second ladder clip;

wherein the first ladder clip further comprises a first shaft, a first hook, and an first brace;

wherein the first shaft is further defined with a first end and a second end;

wherein the second ladder clip further comprises a second shaft, a second hook, and a second brace;

wherein the second shaft is further defined with a third end and a fourth end;

wherein the first end of the first shaft is attached to the lower side of the top side;

wherein the third end of the second shaft is attached to the lower side of the top side;

wherein the first hook is formed in second end;

wherein the second hook is formed in the fourth end;

wherein the first hook is a triangular projection that projects away from the second end;

wherein the second hook is a triangular projection that projects away from the fourth end.

2. The tool holder according to claim 1 wherein the first compartment further comprises a magnetic plate.

3. The tool holder according to claim 2 wherein the magnetic plate is mounted on the upper side of the top side.

4. The tool holder according to claim 3 wherein the first compartment is recessed with respect to the second compartment; wherein the magnetic plate is recessed below the second compartment via a depth.

5. The tool holder according to claim 4 wherein the magnetic plate is adapted to secure an object thereon.

6. The tool holder according to claim 5 wherein the second compartment further comprises a plurality of holes.

7. The tool holder according to claim 6 wherein each of the plurality of holes are adapted to receive and store tools.

8. The tool holder according to claim 7 wherein the plurality of holes are formed in the top side.

9. The tool holder according to claim 8 wherein each of the one or more pockets is a container that is attached to one or more of the sides of the base structure.

10. The tool holder according to claim 9 wherein the edge of the each of the one or more pockets is adapted to receive small items that have clips.

11. The tool holder according to claim 10 wherein each of the plurality of clips are spring like devices;

wherein each of the plurality of clips ca be used to attach items to the base structure.

12. The tool holder according to claim 11 wherein each of the plurality of clips are attached to one or more sides of the base structure.

13. The tool holder according to claim 12 wherein each of the plurality of rings are circular bands.

14. The tool holder according to claim 13 wherein the one or more pockets comprises a first pocket, and a second pocket;

wherein the plurality of clips comprises a first clip, a second clip, a third clip, and a fourth clip;

wherein the plurality of holes comprises a first hole, a second hole, a third hole and a fourth hole;

wherein the plurality of rings comprises a second ring and a third ring.

* * * * *